United States Patent
Goren

(10) Patent No.: US 10,185,660 B2
(45) Date of Patent: Jan. 22, 2019

(54) SYSTEM AND METHOD FOR AUTOMATED DATA ORGANIZATION IN A STORAGE SYSTEM

(71) Applicant: REDUXIO SYSTEMS LTD., Petah-Tiqwa (IL)

(72) Inventor: Avi Goren, Tel Aviv (IL)

(73) Assignee: Reduxio Systems Ltd., Petah Tiqwa (IL)

( * ) Notice: Subject to any disclaimer, the term of this patent is extended or adjusted under 35 U.S.C. 154(b) by 0 days.

(21) Appl. No.: 14/977,859

(22) Filed: Dec. 22, 2015

(65) Prior Publication Data

US 2017/0177476 A1   Jun. 22, 2017

(51) Int. Cl.
G06F 3/06 (2006.01)
G06F 12/06 (2006.01)
G06F 12/109 (2016.01)

(52) U.S. Cl.
CPC .............. *G06F 12/06* (2013.01); *G06F 3/064* (2013.01); *G06F 3/0604* (2013.01); *G06F 3/0673* (2013.01); *G06F 12/109* (2013.01); *G06F 2212/253* (2013.01)

(58) Field of Classification Search
CPC .... G06F 12/06; G06F 12/1036; G06F 12/109; G06F 3/0604; G06F 3/064; G06F 3/0673; G06F 2212/253
USPC ................. 711/154, 200, 202, 203, 206, 209
See application file for complete search history.

(56) References Cited

U.S. PATENT DOCUMENTS

| 7,278,008 B1 * | 10/2007 | Case ................... G06F 12/1036 710/26 |
| 8,819,375 B1 * | 8/2014 | Pruett ..................... G06F 13/28 707/693 |
| 2009/0300040 A1 * | 12/2009 | Kaijima ............ G06F 17/30306 |
| 2013/0151759 A1 * | 6/2013 | Shim ................... G06F 12/0246 711/103 |

* cited by examiner

*Primary Examiner* — Shane D Woolwine
(74) *Attorney, Agent, or Firm* — Pearl Cohen Zedek Latzer Baratz LLP

(57) ABSTRACT

A system and method for managing data in a storage system are provided. A system and method may include receiving a data block and a logical address and identifying, in a set of address sequence range (ASR) objects, an ASR object having an address sequence range that is close to the logical address. A system and method may include storing the data block in the storage system, and updating the ASR object to include the logical address.

20 Claims, 4 Drawing Sheets

US 10,185,660 B2

SYSTEM AND METHOD FOR AUTOMATED DATA ORGANIZATION IN A STORAGE SYSTEM

FIELD OF THE INVENTION

The present invention relates generally to management of data stored in a storage system. More specifically, the present invention relates to organizing data storage units in sequences associated with the storage system.

BACKGROUND

Storage technologies have advanced quickly over recent years, making terabytes of storage available at reasonable cost. To store large amounts of data, storage system use storage mediums where a sequential access pattern is strongly preferable to random access. For example, random access memory (RAM) is a storage media that supports efficient and fast random access to data, however, the cost of RAM or similar memory components prevent such components from being used for storing large amounts of data.

A hard disk drive (HDD) is a storage media that enables storing very large amounts of data at a reasonable cost. However, disk drives are best used for accessing sequential data blocks but exhibit degraded performance and efficiency when accessing random addresses of data. It would therefore be advantageous to provide a technical solution that overcomes the deficiencies of the prior storage systems.

SUMMARY

A system and method may include receiving a data block and a logical address; identifying, in a set of address sequence range (ASR) objects, an ASR object having an address sequence range that is close to the logical address; storing the data block in the storage system; and updating or modifying the ASR object to include the logical address. A system and method may include generating a new ASR object based on a logical address; storing the data block in the storage system; and updating the new ASR object to include the logical address.

A system and method may include determining that the data block is stored in the storage system; and updating the address sequence range the ASR object without storing the data block in the storage system. For example, if a server identifies that a data block is already stored in a storage system then the server may update the address sequence range in the ASR object without storing the data block in the storage system. A system and method may include identifying, in a set of ASR objects, at least one ASR object having an address sequence range that meets at least one criterion; and merging the address sequence range of the at least one ASR object with an address sequence range of at least one other ASR object to produce a new address sequence range.

A system and method may include selecting to merge the at least two address sequence ranges based on a distance between their respective ranges. A system and method may include merging, based on a frequency of access of a data block, at least two address sequence ranges to produce a new address sequence range. A system and method may include receiving a request to access a data block in the storage system, the request including a logical address; and if a pattern of requests for accessing the data block meets a criterion then generating a new ASR object based on the logical address.

A system and method may include calculating a heat value of an address sequence range based on a frequency of requests for reading data in the address sequence range and based on at least one of: a time of the requests, a storage volume that stores a requested data block, a user requesting a data block and an application requesting a data block; and merging at least two address sequence ranges based on a heat value of at least one of the address sequence ranges.

A system and method may include, based on a frequency of access to a data block, creating an ASR object and associating the data block with the newly created ASR object.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1A:
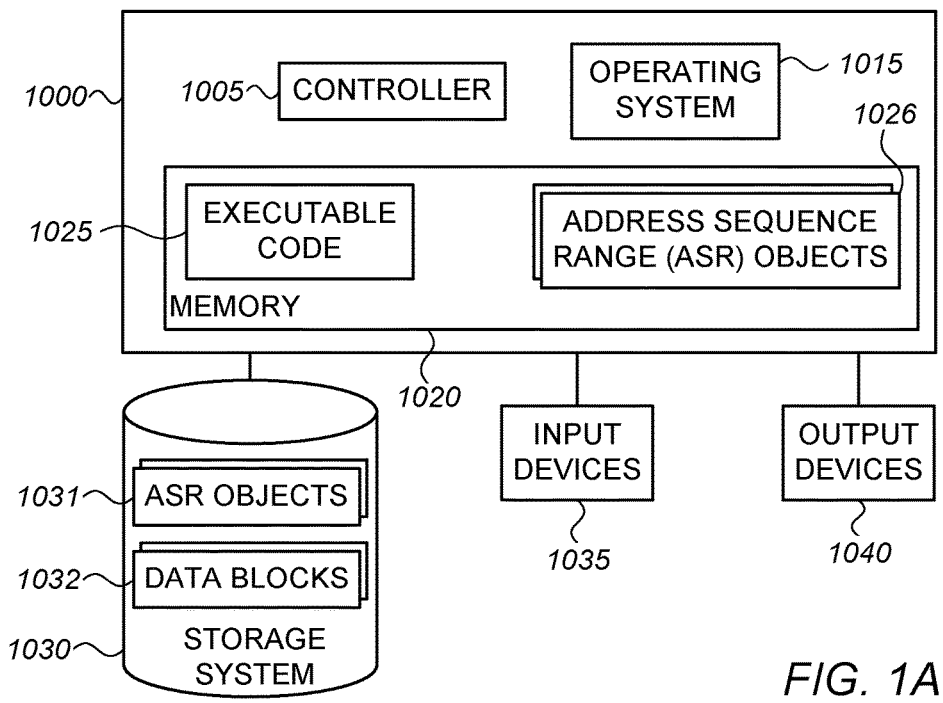
FIG. 1A shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1A, showing a high level block diagram of an exemplary computing device according to embodiments of the present invention. Computing device 1000 may include a controller 1005 that may be, for example, a central processing unit processor (CPU), a chip or any suitable computing or computational device, an operating system 1015, a memory 1020, an executable code 1025, a storage system 1030, input devices 1035 and output devices 1040. Controller 1005 may be configured to carry out methods described herein, and/or to execute or act as the various modules, units, etc. More than one computing device 1000 may be included, and one or more computing device 1000 may act as the various components, for example the components shown in FIG. 1B and described in related text. For example server 1020 described herein may be, or may include components of computing device 1000. For example, by executing executable code 1025 stored in memory 1020, controller 1005 in server 1020 may be configured to carry out a method of managing or organizing data in a storage system as described herein. In some embodiments, controller 1005 may be configured to receive a data block and a logical address of the data block and use the logical address to identify, in a set of address sequence range objects, an address sequence range object that includes an address that is close to the logical address, store the data block in a storage system and update the address sequence range object to include the logical address as described herein.

A system and method may include selecting to merge the at least two address sequence ranges based on a distance between their respective ranges. As further described herein, determining whether or not a first address (e.g., a logical or a physical address), or a range or sequence of addresses, is close to a second address or a range or sequence of addresses may include determining or identifying the distance between the first and second addresses or address ranges or sequences, and comparing the distance to a threshold or criterion. If the distance between addresses, or address ranges or address sequences is greater than a threshold, a system and method may determine the addresses, sequences or ranges are not close to each other, otherwise, a system and method may determine the addresses, sequences or ranges are close to each other. If data blocks, addresses, sequences or ranges are close to each other, a system and method may merge the data blocks or sequences or ranges, e.g., by merging ASR objects as described.

A data block as referred to herein may be any amount or unit of data. In some embodiments, data block may be defined by a configuration parameter. For example, in some embodiments, a data block may be 512 bytes. In other cases, a data block may be data in a disk sector as known in the art. A data unit as referred to herein may be similar to a data block. It will be understood that any data block (e.g., of any size and/or stored in any address on any storage system) may be used by a system and method according to embodiments of the invention and that the scope of the invention is not limited by attributes such as size, address or storage of a data block.

Operating system 1015 may be or may include any code segment (e.g., one similar to executable code 1025 described herein) designed and/or configured to perform tasks involving coordination, scheduling, arbitration, supervising, controlling or otherwise managing operation of computing device 1000, for example, scheduling execution of software programs or enabling software programs or other modules or units to communicate. Operating system 1015 may be a commercial operating system.

Memory 1020 may be or may include, for example, a RAM, a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1020 may be or may include a plurality of, possibly different, memory units. Memory 1020 may be a computer or processor non-transitory readable medium, or a computer non-transitory storage medium, e.g., a RAM.

As shown by blocks 1026, memory 1020 may include ASR objects. For example, memory 1020 may be used as a cache unit (e.g., as cache 130 as described herein) and ASR objects 1026 may be created (e.g., by controller 1005) in memory 1020 or loaded from a database. For example, ASR objects 1031 may be loaded from a database in storage system 1030 into memory 1020.

Executable code 1025 may be any executable code, e.g., an application, a program, a process, task or script. Executable code 1025 may be executed by controller 1005 possibly under control of operating system 1015. For example, executable code 1025 may be an application that manages data in a storage system as further described herein. Although, for the sake of clarity, a single item of executable code 1025 is shown in FIG. 1A, a system according to embodiments of the invention may include a plurality of executable code segments similar to executable code 1025 that may be loaded into memory 1020 and cause controller 1005 to carry out methods described herein. For example, units or modules described herein (e.g., server 120) may be, or may include, controller 1005, memory 1020 and executable code 1025.

Storage system 1030 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 1030 and may be loaded from storage system 1030 into memory 1020 where it may be processed by controller 1005. In some embodiments, some of the components shown in FIG. 1A may be omitted. For example, memory 1020 may be a non-volatile memory having the storage capacity of storage system 1030. Accordingly, although shown as a separate component, storage system 1030 may be embedded or included in memory 1020.

As shown by ASR objects 1031, storage system 1030 may include or store ASR objects. In some embodiments, e.g., in order to keep ASR objects across resets of a system or in order to maintain a large number of ASR objects and loading only some ASR objects into memory 1020, ASR objects may be stored in a database in storage system 1030. For example, when a system (e.g., server 120 that may be similar to, or may include components of, computing device 1000) is rebooted or powered on, the system may load ASR objects 1031 from storage system 1030 into memory 1020. In some embodiments, ASR objects may be dynamically loaded from storage system 1030 during run time, e.g., when an ASR object is needed in order to read information in the ASR object or in order to change information in the ASR object, the ASR object may be loaded into memory 1020.

As shown, storage system 1030 may include or store data blocks 1032. For example, data blocks 1032 may be sectors in a disk included in storage system 1030 or they may be groups of sectors (e.g., a data block may be defined as 10 or 100 sectors in a disk), or they may be any other objects usable for storing data, e.g., chunks or segments of data the size of 10 kilobytes (10 KB) or the size of 10 megabytes (10 MB). It will be understood that a data block as referred to herein may be of any size, may include any digital content and may be stored in any storage system and/or in memory.

Input devices 1035 may be or may include a mouse, a keyboard, a touch screen or pad or any suitable input device. It will be recognized that any suitable number of input devices may be operatively connected to computing device 1000 as shown by block 1035. Output devices 1040 may include one or more displays or monitors, speakers and/or any other suitable output devices. It will be recognized that any suitable number of output devices may be operatively connected to computing device 1000 as shown by block 1040. Any applicable input/output (I/O) devices may be connected to computing device 1000 as shown by blocks 1035 and 1040. For example, a wired or wireless network interface card (NIC), a printer, a universal serial bus (USB) device or external hard drive may be included in input devices 1035 and/or output devices 1040.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 1020, computer-executable instructions such as executable code 1025 and a controller such as controller 1005.

A system according to embodiments of the invention may include components such as, but not limited to, a plurality of central processing units (CPU) or any other suitable multi-purpose or specific processors or controllers (e.g., controllers similar to controller 1005), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 1000.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Embodiments of the invention may create, maintain and use objects, lists or other constructs related to or describing address sequence ranges (e.g., addresses of memory or storage blocks as known in the art). For example, an address sequence range (ASR) object may be a segment in memory 1020 that stores metadata, information or parameters such as for example: a start address of a sequence; an end address of a sequence; a size or amount of data stored in the address range, a mapping of logical addresses to storage blocks on a storage system; a frequency count of accesses to data, a time when data was accessed; an identification of a user or application who accessed data and an identification of a storage volume. Metadata in an ASR object may be, or may include, a unique identifier or pointer that references, or points to, a data block. It will be understood that in some embodiments, other metadata may be stored in an ASR object or list while in other embodiments only some of the metadata described herein is stored. As described herein, an ASR object may be associated with data. For example, an association of an ASR object with data stored in a storage system and/or in a cache system may be, or may include, a pointer or other reference that may be used to find (or determine a location) of the associated data in a storage system. For example, recording, in an ASR object, the start and end addresses of data in a storage system may be the association of the data with the ASR. In other cases, an association of data with an ASR may be, or may include, storing the actual data (or payload as referred to in the art) in the ASR object.

Although ASR objects are mainly discussed herein it will be understood that any structure or construct (e.g., a list, a linked list or a file) may be used by embodiments of the invention to store information related to or describing address sequence ranges. For example, an ASR object may be an entry in a list. ASR objects may be stored in a persistent storage (e.g., a hard disk) and may be loaded into a memory, e.g., loaded into memory 1020 when server 120 is powered on.

Although disk drives are mainly discussed herein it will be understood that any storage system (e.g., a disk array, tape, CD, or cloud-based storage) may be used by embodiments of the invention. For example, any mass storage component, device or system may be used.

A system and method according to embodiments of the invention may handle the organization of data blocks in sequences associated with a storage system such as a hard disk drive or other storage systems or related standards. A system and method according to some embodiments may include receiving a data block and a logical address and identifying, or determining, whether or not the data block is already stored in a storage system. If a received data block is not stored in a storage system, a system and method according to some embodiments may determine whether or not the logical address of the data block is close to a sequence included an ASR object or list. If the logical address is close to a sequence included an ASR object, a system and method according to some embodiments may store a copy of the data block with respect to the existing sequence and may update the ASR object or list such that it includes the logical address.

If a received data block is not yet stored in a system, a system and method according to some embodiments may generate a new ASR object, may store a copy of the data block with respect to the new ASR object and may further update the ASR object, e.g., such that it includes a reference to the stored data block and/or includes metadata such as the range of addresses used to store the stored data block. For example, a newly created ASR object may be updated to include the sequence of the received data block based on the logical address received with the received data block.

According to some embodiments, multiple ASR objects may be merged to create an ASR object that includes (or is related to) a small or minimal sequence range. According to some embodiments, data blocks may be moved from one ASR object to another thus increasing the efficiency of access to, or retrieval of, the data blocks. As described herein, merging of ASR objects may be triggered by, or based on, a number of events, conditions, criteria or rules. For example, a number of access operations related to, or a number of retrievals of, the same data block in a storage system, using different logical addresses, may cause a system or method according to embodiments of the invention to merge two or more ASR objects into a single ASR object or create a new ASR object that includes the data block. As referred to herein, accessing a data block or data unit may include any operation related to the data block or unit, e.g., reading data from, writing data to, and/or modifying data in the data block or data unit.

Figure 1B:
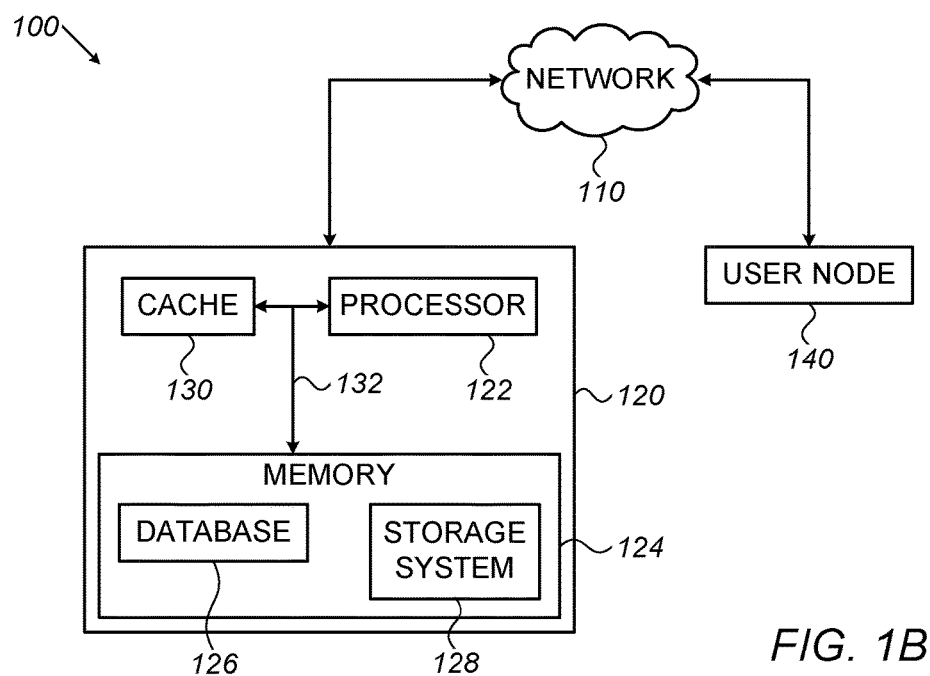
FIG. 1B is a schematic block diagram of a network system utilized to describe various disclosed embodiments of the present invention.

Reference is now made to FIG. 1B, an exemplary and non-limiting block diagram of a system 100 (referred hereinafter as system 100) according to embodiments of the invention. As shown, a system 100 may include a network 110, a server 120 and a user node 140. Network 110 may be a local area network (LAN), a wide area network (WAN), a metro area network (MAN), the worldwide web (WWW) or the Internet. Network 110 may be, or include, a wired and/or wireless network or any combinations thereof.

Server 120 may be, or may include components of computing device 1000. For example and as shown, server 120 may include a processing unit or a central processing unit (CPU) 122 that may be similar to controller 1005, which, in a preferred embodiment, performs general control and computational functions.

As shown, server 120 may include a memory unit 124 (that may be similar to memory 1020) containing therein instruction executable by the processing unit 122. Memory 124 may include a database 126 and a storage system or component 128. Database 126 may be configured to maintain information respective of blocks of data stored in the storage 128. For example, ASR objects may be stored in database 126.

Server 120 may include a local cache 130 which may be configured to perform caching of data blocks to be stored in storage system 128 for further use, thereby avoiding overhead. The components of server 120 may be connected to each other via a communication bus 132.

Storage system 128 may be part of the server 120 or communicatively connected to the server 120, for example, via the network 110. Storage system 128 may be any hardware, software, firmware or any combination thereof. Storage system 128 may be configured to store digital information and/or to retrieve digital information (e.g., data blocks) from a close location. Data may be stored in one or more tiers of storage system 128. Non-limiting examples of storage system 128 include a mass storage system such as a CD/DVD-ROM drive, a hard disk drive (HDD), a universal serial bus (USB™), and the like.

According to some embodiments, server 120 may be communicatively connected to user node 140 via the network 110. User node 140 may be, or may include components of, computing device 1000. For example, user node 140 may be, but is not limited to, a tablet computer, a laptop computer, a smartphone, a cellular phone, a notebook computer, a wearable computing device, and the like. FIG. 1B shows one server 120, one processing unit 122, one memory 124, one database 126, one storage component 128, one local cache 130 and one node 140 merely for the sake of simplicity of the description. However, in some embodiments, there may be a plurality of each, in any combination. It will be understood that any number of servers 120, caches 130, memories 124, databases 126 and storage components 128 may be used in a system without departing from the scope of the disclosed embodiments.

According to some embodiments, the server 120 receives, through a network interface (not shown), information regarding data blocks to be stored in storage system 128. For example, server 120 receives requests to access, read or write data blocks in storage system 128, or server 120 receives, from a user or an application, requests to store data in storage system 128 or requests to retrieve data from storage system 128.

A request related to data in storage system 128 (e.g., read or write data blocks) received by server 120 may include but is not limited to, the data blocks and a logical address associated with each data block. Server 120 may store the data blocks, or portion thereof, in sequences of storage system 128 for easy reference and retrieval. For example, data blocks may be stored in storage system 128 in contiguous or adjacent sectors, blocks or other storage units used by storage system 128. For example, a set of data blocks included in (or referenced by) an ASR object may be stored in a contiguous set of blocks in storage system 128. Since storage system 128 may be a mass storage system that best operates when accessing a contiguous set of blocks, storing, e.g., on a disk, a sequence or set of a selected data blocks closely together may increase efficiency of a system if all or most of the blocks in the selected set are typically accessed together, e.g., in the same request from a user or application.

As described herein, server 120 may create ASR objects, e.g., in cache 130, and include data blocks, e.g., in unsealed or non-persistent ASR objects. Including a data block in an ASR may be, or may include, storing the actual data in the ASR object. Adding a data block to an ASR may include updating metadata of the ASR, e.g., recording an address of the added data block in the ASR.

Adding a data block to an ASR may include only updating (e.g., adding data to, or modifying data) metadata in the ASR object. For example, to add a data block to an ASR, metadata of the ASR may be updated to include, in its address range, the address of the data block but the actual data (or payload) of the data block may not be copied or moved. Accordingly, an ASR may include a data block by referencing the data block.

As described herein, server 120 may be configured to merge existing ASR's, e.g., based on a size of address ranges in two ASR objects, the two ASR objects may be merged or combined into a single ASR object. For example, server 120 may be provided with a criterion, rule or threshold and, if an ASR object meets a criterion, e.g., the size of an address range of (or in) the ASR object is above a threshold, the ASR object may be merged into, or combined with, another ASR object to produce a new ASR object. Merging of ASR objects may be, or may include, merging their respective address ranges to produce a new address, the new address range including the merged address ranges.

Server 120 may move data blocks from one ASR object to another, e.g., when a reorganization of the data blocks is required. According to some embodiments, the metadata or other information regarding the data blocks (e.g., the logical address of the data blocks) may be stored in database 126 for further use. Organization and the reorganization of the data blocks according to embodiments of the invention are described in more detail herein.

Figure 2:
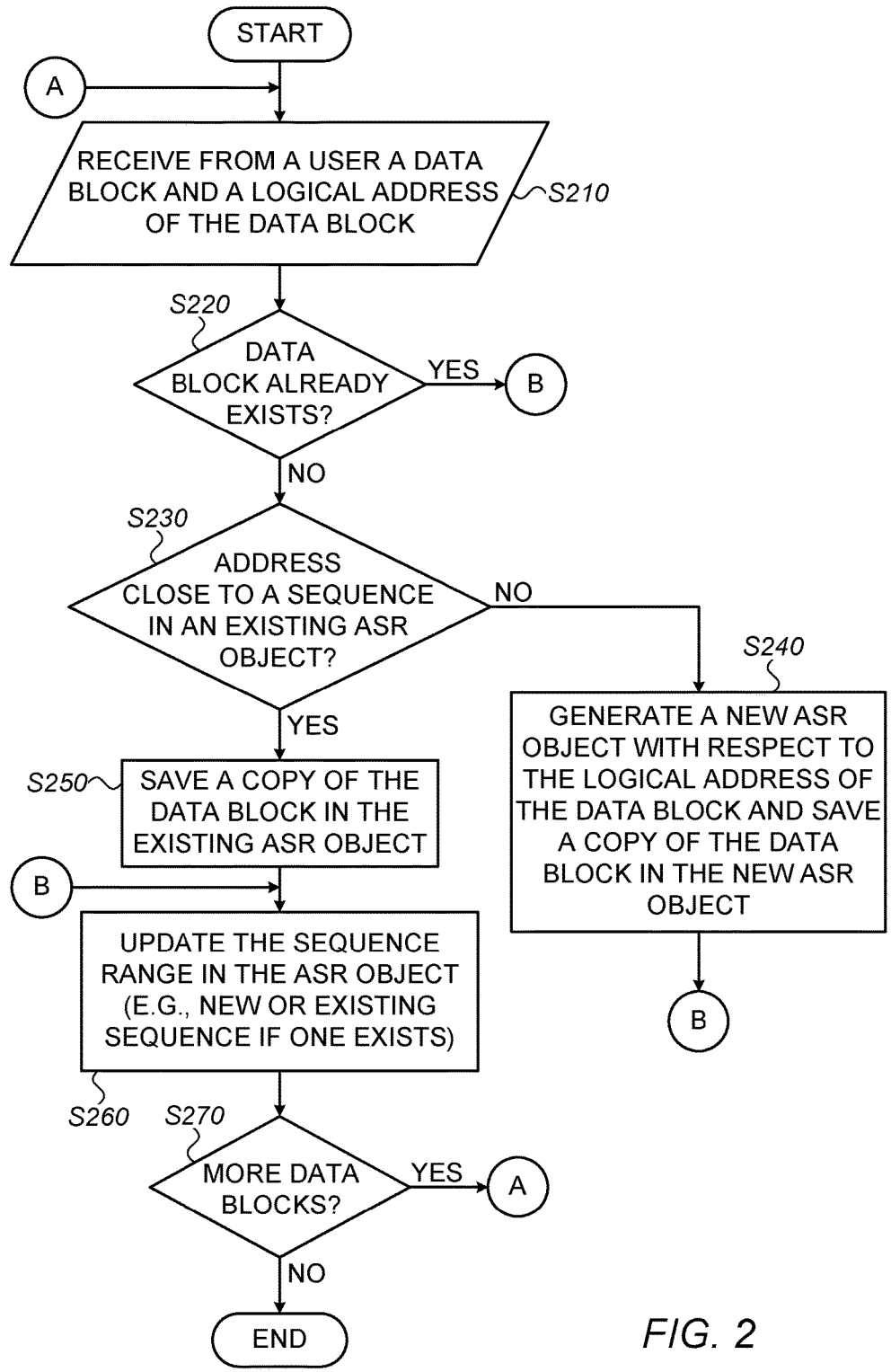
FIG. 2 is a flowchart of a method for storing data blocks in a storage system according to an embodiment of the present invention.

Reference is now made to FIG. 2, which shows a flowchart of storing data blocks in a storage system according to an embodiment. For example, the flow shown in FIG. 2 may describe storing data blocks in a storage system (e.g., storage system 128) according to some embodiments.

It should be noted that, although discussion of FIG. 2 will be made with respect to system 100 described in FIG. 1B, the steps of this flowchart may be performed with respect to another system without departing from the scope of the disclosed embodiments. As shown by block S210, a data block and a logical address of the data block may be received from a user or application. For example, server 120 receives a data block together with the logical address of the data block, for example, from a user node (e.g., user node 140).

As shown by block S220, a system and method according to embodiments of the invention may determine whether or not a received data block is already stored in a storage system. For example, server 120 may check and determine whether or not a received data block is already stored in storage system 128. According to some embodiments of the invention, if it is determined (e.g., by server 120) that a received data block is already stored in storage system 128 then the flow may continue as shown by block S260. Although not shown, prior to proceeding to block S260 from block 220, a system and method may check whether or not there is a close address sequence range that can be updated (e.g., modified or have data added to) to include the received data block. For example, proceeding to block S260 from block S220 may include performing a check as shown by block S230. For example, after determining a data block does exist as shown by block S220, a system and method may check whether or not an ASR object with an address sequence range that is close to the address of the received data block exists and, if so, a sequence range may be updated as shown by block S260. If an address sequence range that is close to the address of the received data block does not exist or cannot be found, a system and method according to embodiments of the invention may update its internal data, e.g., a list or other construct that records or stores the address of the received data block, e.g., such that when a subsequent data block is received, a system and method can check whether or not the address of the subsequent data block is close to the address of the received data block.

Checking or determining whether or not a received data block is already stored in a storage system may be performed by using, for example, a local cache 130 of server 120. For example, local cache 130 may be used as a caching unit for storage system 128 and may be filled using read-ahead techniques known in the art. For example, server 120 may compute and keep hash numbers or values for data blocks stored in a storage system, compute a hash number for a received data block, and determine whether or not the received data block is already stored in the storage system by comparing hash numbers as known in the art.

As shown by block S230, a system and method according to embodiments of the invention may determine whether or not the logical address of a received data block is close to or near the addresses in an address range of one or more ASR's. For example, if the logical address of a received data block is 17 then, e.g., based on a threshold value of four (4), it may be considered close to or near an address range of twenty to twenty seven (20-27) since the distance from this first address range to the nearest boundary of the range is smaller than the threshold, and far from an address range of thirty one to forty (31-40) since the distance from this second address range is larger than the threshold. For example, using a threshold value or other configuration parameter or value, server 120 may check or determine whether or not the logical address of the received data block is close to a sequence that already exists in the storage system 128. Other methods of determining if addresses are close may be used.

As known in the art, a logical address is the address at which an item (e.g., memory cell, storage element) appears to reside from the perspective of an application. A logical address may be different from the physical address due to the operation of an address translator or mapping function. Such mapping functions may be, in the case of a computer memory architecture, a memory management unit (MMU) between the CPU and the memory bus, or an address translation layer (See https://en.wikipedia.org/wiki/Logical address).

As shown by block S240, a new ASR may be created with respect to the logical address of a received data block. Metadata of the new ASR object may be updated (e.g., modified, or have data added) to include the address (e.g., logical address) of the received data or data block. For example, if a received data block is not stored (or does not exist) in storage system 128 and, in addition, an ASR object that includes an address range close to the logical address of the received data block does not exist, server 120 may create an ASR respective of the logical address of the received data block and a copy of the data block may be saved respective thereof, e.g., in the storage system 128.

Upon receiving a data block as described and deciding the a new or additional ASR object is needed, a system and method may create a new ASR object and use the new ASR object in order to handle the received data block. For example, after receiving a data block as shown by block S210, a new ASR object may be created. Generally, a new ASR object may be an ASR object that is created after, when, or upon, a data block is received (e.g., as shown by block S210) and after, when, or upon, identifying or determining that an additional or new ASR object is required. For example, an additional (or new) ASR object may be required and created if a system and method cannot find an ASR object (or an address sequence range) that is close to the address of the received data block.

As shown by block S250, a copy of the received data block may be saved or stored with respect to an existing ASR object. For example, the received data block may be stored in storage system 128 and the relevant or related ASR object may be updated. As shown by block S260, metadata of an ASR object may be updated. For example, the address sequence range of the already existing data or the new data may be added to, or updated in, an ASR object, and the ASR object may be stored in database 126. As shown by block S270, a system and method according to embodiments of the invention may iteratively process received data blocks, e.g., by checking whether additional data blocks have been received. For example, server 120 may check for additional requests to store data, e.g., received as described.

Figure 3:
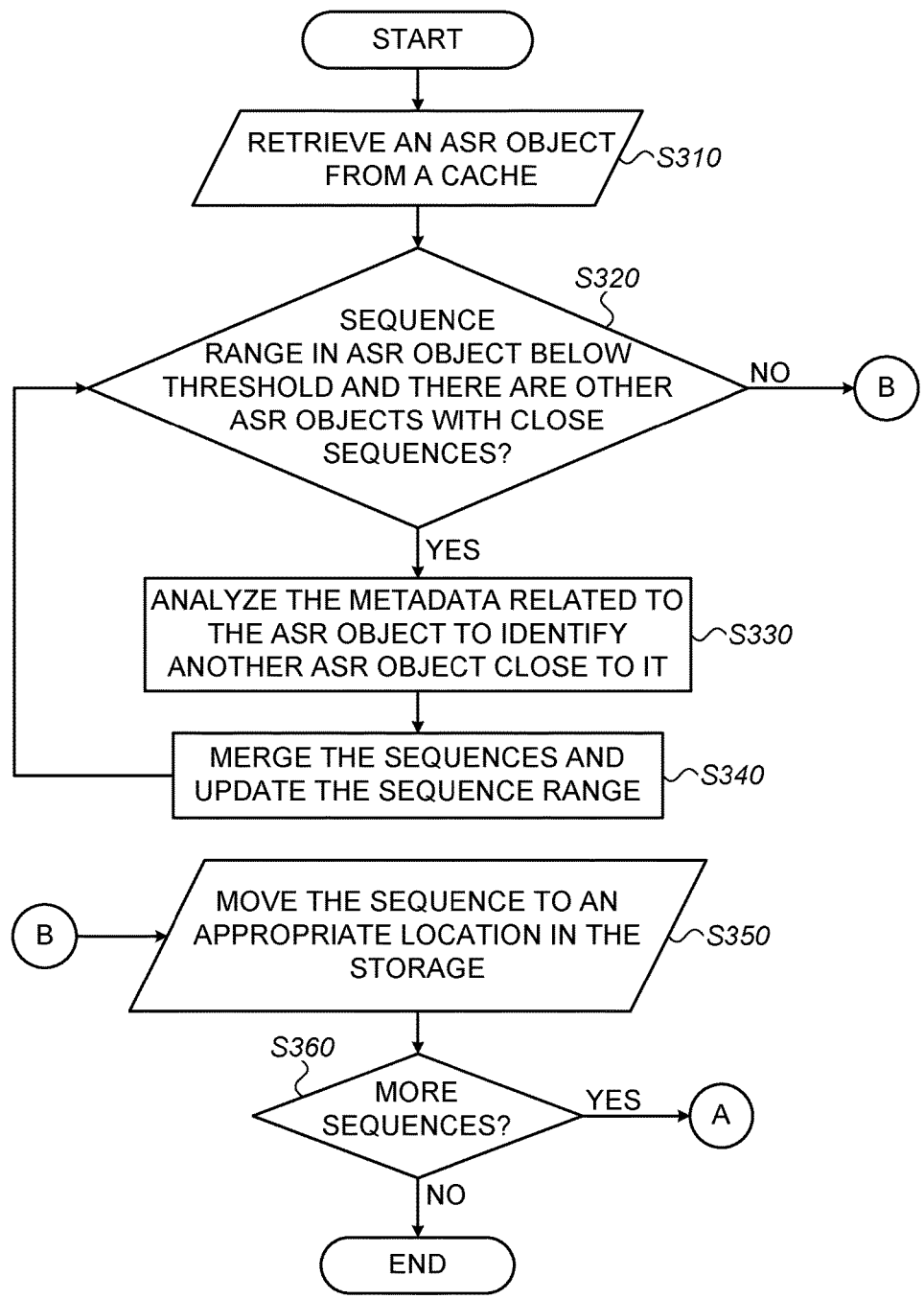
FIG. 3 is a flowchart of a method according to an embodiment of the present invention.

Reference is now made to FIG. 3, a flowchart of a method according to an embodiment of the present invention. For example, the flow shown in FIG. 3 may be used or followed by embodiments of the invention to merge ASR's and optimize storage of data blocks in a storage system. It should be noted that, although discussion of FIG. 3 will be made with respect to the system 100 described in FIG. 1B, the steps of this flowchart may be performed with respect to another system without departing from the scope of the disclosed embodiments.

As shown by block S310, a system and method according to embodiments of the invention may retrieve data from a cache and respective metadata, e.g., from a related ASR in database 126. For example, server 120 may retrieve or evict data blocks from cache 130. Server 120 may obtain metadata such as the address sequence range, or the logical addresses of the data blocks in a sequence or set of data blocks from an ASR object in database 126.

As shown by block S320, a size of an address sequence range may be related to a threshold. Generally, a size of an ASR (or ASR object) may be, or may indicate, the amount of data associated with the ASR object or it may be the size of the address range. For example, an ASR object may include a start address of 100 and an end address of 1000 and therefore, the size of the ASR may be 900. In another case, an ASR object may include the size or amount of data associated with the ASR object, in such case, the size of the ASR object as referred to herein may be the size or amount of data associated with the ASR object. Similarly, a size of an address sequence range may be the amount of data stored in the address sequence or it may be the size of the sequence, e.g., calculated by "end address–start address". For example, server 120 may check or determine whether or not the size of an address range of the retrieved data is below a predetermined threshold.

As shown by block S330, metadata related to the retrieved data (e.g., metadata included in an ASR) may be analyzed to identify one or more data blocks with logical address that is close to the address sequence range of the retrieved data. For example, if the ASR object of the retrieved data indicates that the address sequence range of the retrieved data is 56-74 then an ASR object with a range of 75-92 may be considered a close ASR object. According to some embodiments of the invention, a first and a second ASR objects or address sequences may be considered close even if they are not contiguous. For example, the address sequences of 56-74 and 77-92 may be considered close as described herein even though the gap of 75-76 separates the two sequence ranges (or related ASR objects). In some embodiments, a criterion, threshold parameter or value may be used in order to determine whether or not two sequence ranges or respective two ASR objects are close and/or should be merged as described herein. For example, if a threshold value is set to 100 then the address sequences 100-200 and 290-320 may be considered as close, but the address sequences 300-400 and 510-620 may not qualify, or be identified, as close.

In some embodiments, the closest address, address range or ASR object may be identified. For example, given an address or a range of addresses, server 120 may identify or find more than one other addresses or a ranges of addresses that are close to the given address or range, e.g., more than one address or range with a distance from the given address that is less than a distance threshold as described herein. If more than one close address or range are identified or found by server 120, server 120 may pick the address or range that is the closest to, or that has the smallest distance from, the given address, range or ASR object. For example, merging an ASR object or an address ranges with another ASR object or address range as described herein may include selecting, from a plurality of ASR objects or address ranges, the one closest to the ASR object or address range and merging the ASR object or address range with the selected ASR object or address range.

As shown by block S340, sequences or ASR objects may be merged. For example, a first ASR object may be updated to include an address sequence range of a second ASR object and the second ASR object may then be deleted or removed. Merging two or more ASR objects (or original ASR objects) as described herein may be, or may include producing a merged ASR object. For example, a merged ASR object may include the address ranges of two or more original or merged ASR objects. For example, if the address ranges of two original ASR objects are 100-200 and 200-300 then the address range of the merged ASR object may be 100-300. A merged ASR object may include any metadata of two or more original ASR objects. For example, a merged ASR object may include references to all data blocks references by the original ASR objects and/or any other metadata included in ASR objects as described herein.

As shown by the arrow connecting blocks S340 and S320, a system and method may merge ASR objects based on a threshold, or criterion. For example, a size threshold may be used in order to keep address ranges in ASR objects below, or at an optimal size. For example, a system and method may continue to merge address sequence ranges as long as the total or combined size of the resulting address sequence range is below a threshold. Accordingly, a system and method may loop through the operations shown by blocks S320, S330 and S340 until a threshold is met and, if the threshold is met as shown by block S320, proceed to block S350.

In some embodiments, server 120 may analyze address sequence ranges (e.g., in ASR objects) identify close or adjacent address sequence ranges (e.g., in one or more ASR objects) and merge ASR objects to produce an ASR object with a larger address sequence range. An updated or new ASR object may be stored, e.g., in database 126.

As shown by block S350, a sequence of data blocks, e.g., as recorded in metadata of an ASR object, may be moved or stored in a storage system. For example, a set of data blocks included in, or references by, an ASR object may be stored together, e.g., in a contiguous set of blocks, in storage system 128. In some embodiments, a sequence or set of data blocks may be moved to a physical address in a storage system (e.g., the storage system 128 of the server 120). According to some embodiments, the physical address is typically determined respective of the free space available in the storage system 128. For example, a large sequence or set of data blocks may be stored in a physical address where there is enough free space to contain the entire set or sequence.

As shown by block S360, a system and method may iteratively, periodically or continuously check for data that may be removed or evicted from a cache. For example, server 120 may check, iteratively, periodically or continuously, whether there are additional sequences of data blocks in the local cache 130 that may or should be evicted as shown by block S360. Removing data from a staging component such as cache 130 may be done based on a rule, criteria or configuration. For example, server 120 may remove data from cache 130 periodically (e.g., once every minute or hour) or server 120 may check the amount of data stored in cache 130 and, based on the amount, select whether or not to remove data from cache 130, e.g., based on the flow described herein. In other cases, server 120 may remove data from cache 130 based on a command or request from a user or from an application. Removing data from a caching system may be done in order to maintain a storage system up to date. For example, if data is modified in cache 130, server 120 may update storage system 128 by copying the modified data to storage system 128 and may then select to remove the data from cache 130.

Figure 4:
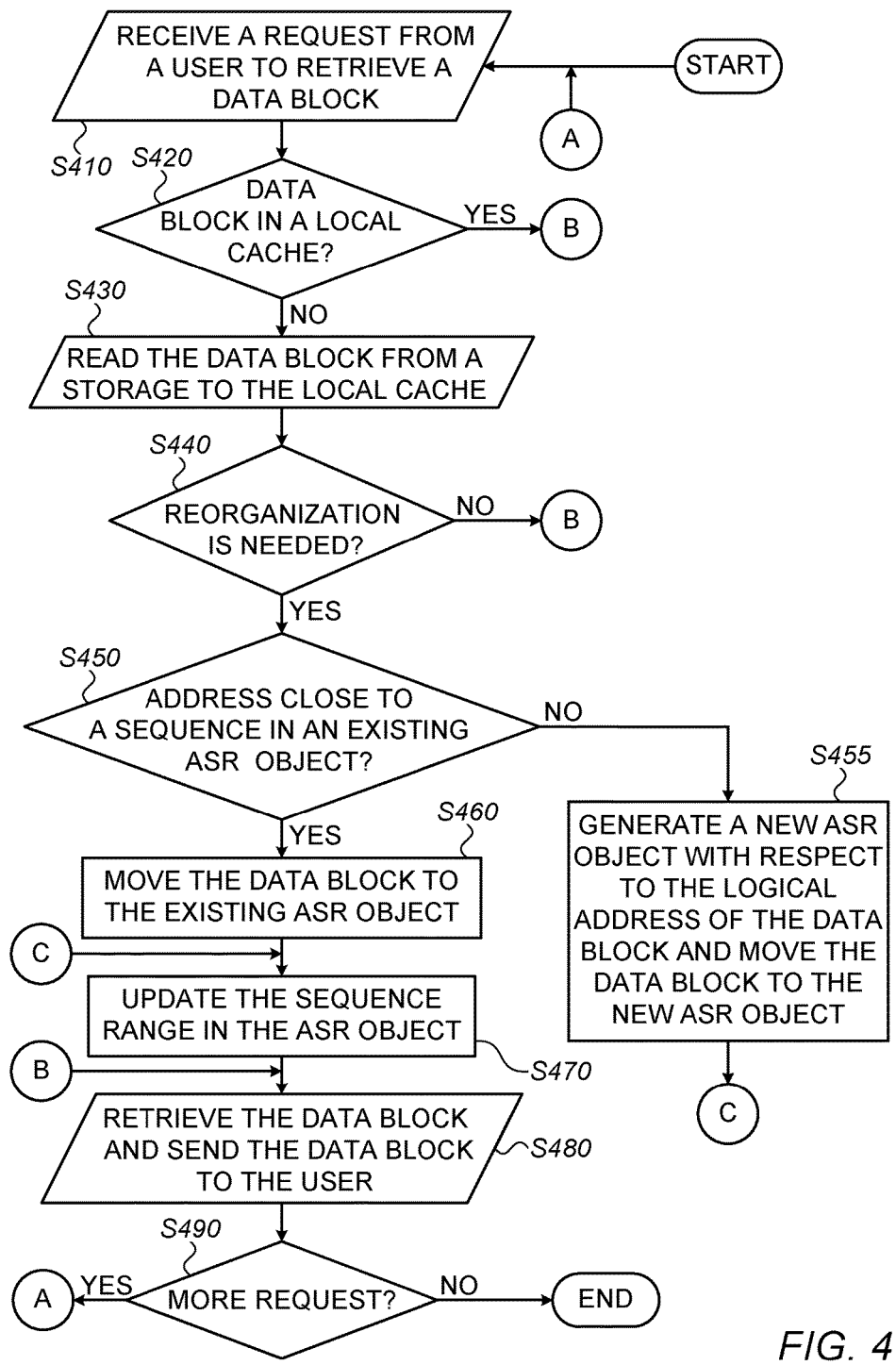
FIG. 4 is a flowchart of a method according to an embodiment of the present invention.

Reference is now made to FIG. 4, a flowchart of a method according to an embodiment of the present invention. For example, the flow shown in FIG. 4 may be used or followed by embodiments of the invention in order to reorganize data blocks and their respective sequences in storage system 128. It should be noted that, although discussion of FIG. 4 will be made with respect to the system 100 described in FIG. 1B, the steps of this flowchart may be performed with respect to another system without departing from the scope of the disclosed embodiments.

As shown by block S410, a system and method may receive a request from a user to retrieve one or more data blocks (referred to herein as requested blocks). For example, server 120 may receive from a user of a user node (e.g., user node 140), a request to retrieve a data block. As shown by block S420, a system and method may determine whether or not a requested data block can be found (e.g., exists, or stored) in a cache unit. For example, server 120 may check or determine if, or whether or not, the requested data block is stored in local cache 130 of server 120.

As shown by block S430, if the data block cannot be retrieved from a cache unit, a system and method may read the data block from a storage system to the cache unit. For example, server 120 may read the requested data block from storage system 128 and store the requested data block in local cache 130.

As shown by block S440, a system and method may determine whether or not reorganization of data is needed. For example, server 120 may check whether or not a reorganization of the data blocks in storage system 128 is required or needed. Generally, reorganizing data blocks in storage system 128 includes storing data blocks such that access is optimized, e.g., storing a set of data blocks in a contiguous set of addresses on a disk in storage system 128. Reorganizing data blocks may include any manipulation of data blocks, e.g., moving data blocks, copying data blocks, removing or deleting data blocks and the like.

In some embodiments, checking whether or not reorganization of data is required may include identifying or determining an access frequency of data. For example, an access frequency of a set of one or more data blocks may be, or may be calculated based on, the number of times the set of data blocks were accessed during a time period. The number of times a set of data blocks included in, or referenced by, an ASR object may be included in the metadata of the ASR object. Accordingly, to determine an access frequency of the set of data blocks, server 120 may examine metadata of ASR objects.

In some embodiments, an access frequency that is above a predetermined threshold may indicate that reorganization is required, e.g., in order to improve efficiency of retrieval of data from storage system 128, data blocks in storage system 128 should be moved. Moving a data block may include changing its physical address in a storage device as known in the art. For example, reorganization may include merging a number of data blocks into a single, contiguous data block, copying a number of data blocks to a new address such that they form one or more contiguous blocks or units of data and so on. An access frequency and a threshold may both be a numbers or values. For example, an access frequency may be a number between zero and one (0-1) and a threshold may be the value 0.67. An access frequency may be monitored, measured and/or calculated as known in the art, e.g., by recording the number of access operations in a unit of time.

Deciding, determining, or identifying, that reorganization is required may be based on various aspects, considerations and parameters. For example, server 120 may calculate a heat value of, or for, an address sequence range or data block based on a frequency of accesses to the address sequence range or data block, e.g., requests for reading data in the address sequence range or requests for writing data to the address sequence range or the data block. A heat value may be calculated or updated based on at least one of: a time of a request, a storage volume that stores a data block or address sequence range, a user requesting data in a data block or address sequence range, and an application accessing an address sequence range or data block. Sever 120 may merge at least two address sequence ranges based on a heat value of at least one of the address sequence ranges.

For example, server 120 may determine that reorganization and/or merging of ASR objects, or merging of address sequence ranges as described, based on a frequency of access to a data block or an address sequence range. For example, a heat value of a data block or of an address sequence range may be calculated, e.g., by server 120, based on a frequency of requests for reading data in the address sequence range or in the data block. As described, an ASR object may be linked to, or associated with an address sequence range, accordingly, a heat value may be calculated an ASR object.

A heat value of an address sequence range or data block may be dynamically updated or modified (e.g., increased by server 120 that may monitor access to address sequence ranges) based on the number of times that the address sequence range is accessed. A heat value may be dynamically updated or modified based on a frequency, e.g., based on the number of accesses per time unit. For example, a heat value of a data block may be increased when the data block is accessed and may be decreased or made to decay if the data block is not accessed over a predefined time period. Accordingly, a high heat value of a data block may indicate the data block or address sequence range is frequently accessed.

Various parameters and/or aspects may be used, or taken into account in order to maintain or calculate a heat value of an address sequence range. For example, in addition to reflecting, or being changed based on, the number of accesses to a data block or to an address sequence range, a heat value may be changed based on the time or day. For example, an access to an address sequence range during working or office hour may cause server 120 to change (or increase) the heat value of a data block or address sequence range by steps of 2 (e.g., 2, 4, 6, . . . ) and an access to the same address sequence range during the night may cause server 120 to change (or increase) the heat value of a data block by steps of 1 (e.g., 1, 2, 3, . . . ), e.g., in order to prioritize reorganization of data or files that are accessed during work hours.

A heat value may be calculated based on a storage volume that stores a requested data block. For example, a request to access a data block in a first storage volume may cause server 120 to increase the heat value of the data block by steps of 3 (e.g., 3, 6, 9, . . . ) and a request to access a data block in a second or other storage volume may cause server 120 to increase the heat value of the data block by 6 (e.g., 6, 12, 18, . . . ). For example, by calculating or modifying a heat value differently, a system and method may treat different storage systems differently. For example, since a reorganization of data as described may be based on a heat value, different logics for maintaining the heat values of data blocks on different storage systems enable a system and method of the invention to perform reorganization of data for each storage system based on different criteria.

A heat value of a data block may be modified based on the user or application accessing the data block. For example, server 120 may increase a heat value of a data block by 5 when a first user accesses the data block and increase the heat value of the data block by 10 when a second user accesses the data block, for example, in order to prioritize reorganizations of files accessed by the second user.

Sever 120 may merge two or more address sequence ranges, or merge two or more ASR objects associated with, or including, the two or more address sequence ranges, based on a heat value of at least one of the address sequence ranges or ASR objects. For example, if a heat value of an address sequence range is above a threshold value, server 120 may merge the address sequence range (or the associated ASR object) with another address sequence range (or ASR object). ASR objects may be merged based on a pattern of accesses or requests. For example, although a set of address sequence ranges may be accessed only few times a day, the accesses may all include accessing all the address sequence ranges in the set, or they may all be done during a short time, e.g., within less than a minute, thus, while the heat values of the address sequence ranges may be relatively low, the pattern of requests (e.g., accessing the entire set and/or the duration within which the accesses are made) may cause server 120 to merge the set of address sequence ranges (e.g., by merging ASR objects as described). Any criterion related to any patterns may be used in order to merge ASR objects or create new ASR objects based on a pattern of accesses, e.g., a pattern of requests for accessing a data block.

Accordingly, in some embodiments, a heat value of an address sequence range, a heat value of an ASR object or a heat value of a data block or unit may be a number, e.g., 0-100 where, for example, a heat value of 6 indicates that the address sequence range, ASR object or data block is rarely accessed and a heat value of 89 indicates that the address sequence range, ASR object or data block is frequently accessed. Accordingly, a heat value may represent or indicate an access frequency of an address sequence range, a heat value of an ASR object, e.g., the number of times a data block is accessed in one minute, hour or day or the total number of times an address sequence range, a heat value of an ASR object was accessed.

As described, a heat value may be calculated based on, or using, various methods or logic, e.g., a heat value may be changed differently for different storage systems or different time of day, or changing a heat value may be based on the entity accessing data as described.

A heat value may be used in order to determine whether or not to merge ASR objects. For example, using the heat values of ASR objects, a server may select for merging ASR objects that are frequently used, e.g., instead of merging, or attempting to merge, all ASR objects in a system. For example, instead of randomly merging ASR objects or merging ASR objects according to a list that includes all ASR objects in a system, a system or method may first (or only) merge ASR object with high heat values. For example, a server may check heat values of ASR objects and, if a heat value of an ASR object is above a predefined (e.g., configured by a user) threshold or limit, the server may merge the ASR object with another ASR object. Any method or logic may be used in order to merge ASR objects based on a heat value. For example, if a heat value of an ASR object is above a threshold or meets another criterion, a serve may search for an ASR that is close to the ASR object and merge the two ASR objects.

As shown by block S450, a system and method may determine whether or not the addresses of the requested blocks are close to an address of data already stored in storage system 128. For example, a system and method may determine whether or not the addresses of requested blocks are close to an address range in an ASR object. In some embodiments, a set of ASR objects stored in cache 130 or stored in database 126 may be examined (e.g., by server 120) in order to determine if the logical addresses of requested blocks are close to the sequence address range of one or more ASR objects.

As shown by block S455, a system and method may generate a new ASR object with respect to the logical address of the requested data blocks and include or associate the requested data blocks in or with the new ASR object. For example, the range of logical addresses of the requested data blocks may be included in metadata of the new ASR object.

As shown by block S460, if an ASR object with an address range that is close to the range of addresses of the requested data blocks is found (e.g., as described with respect to block S450), a system and method may include the requested data blocks in the ASR object.

If or when an ASR object with an address range that is close to the range of addresses of the requested data blocks is found, the requested data blocks may be moved, e.g., in storage system 128, such that they are physically stored near the data blocks already included in, or referenced by, the ASR object. For example, the data blocks already included in, or referenced by, the ASR may be stored, in storage system 128, at physical addresses twenty to twenty four (20-24) and the requested data blocks may be stored at addresses one thousand to one thousand and two (1000-1002). In such case, the requested data blocks may be moved from their current addresses (1000-1002) to addresses twenty five to twenty seven (25-27) such that they are physically close to the other data blocks of the ASR object.

It will be noted that the actual data of the requested data blocks may not necessarily be moved as part of including then in the ASR object, for example, to include the requested data blocks in an ASR object, only metadata of the ASR object may be updated and the requested data blocks may be left were they were. Accordingly, moving data blocks to an ASR object or including data blocks in an ASR object as shown by block S460 may include or comprise updating metadata in the ASR object such that the data blocks are indicated in, or referenced by, the ASR object. For example and as shown by block S470, an address sequence range in an ASR object may be updated. For example, assuming the logical address of a block requested as shown by block S410 is six ("6") and further assuming an ASR object with an address sequence range of seven to twelve (7-12) is found as shown by block S450, server 120 may update the address sequence range of the ASR object to be six to twelve (6-12) thus including the requested data block in an ASR object.

As shown by block S480, the requested data block may be provided to the requesting user. For example, the data block may be retrieved and sent to user node 140 via network 110. As shown by block S490, the process or flow may be iterative, e.g., the flow shown in FIG. 4 may be repeated as long as requests for data blocks are present, e.g., in a request queue of server 120.

As described, a system and method according to embodiments of the invention may enable an optimal arrangement of data on a mass storage device or any storage device that works best when data is written to, or read from, a contiguous set of addresses. For example, as known in the art, an HDD can cheaply store very large amounts of data, however, in order to read data that is scattered on the HDD, a read/write head needs to be moved. Accordingly, performance of an HDD is increased if data to be read is located in a sequential address range. Otherwise described, performance of a mass storage device (e.g., HDD) degrades when access to random, non-sequential addresses is required.

Embodiments of the invention may organize data in a mass storage device such that data blocks that are typically written or read together are also stored, in the mass storage device, in a contiguous sequence or set of addresses thus improving efficiency.

Generally, a system and method may use a component suitable for random access (e.g., a cache or RAM as known in the art) in order to store, define, form or create sequences of data blocks. For example, an ASR object described herein enables defining, creating and/or using sequences of data blocks in cache 130. Data in a mass storage device (e.g., data in storage system 128) may be organized or stored based on defined, formed or created sequences of data blocks. For example, data in storage system 128 may be stored or organized based on information in ASR objects that may be stored in database 126 and/or loaded into a memory where they may be examined, modified or otherwise manipulated. For example, any operation related to ASR objects as described herein may include loading an ASR object from database into a memory (e.g., cache 130), examining and/or modifying the ASR object in the memory, and, if need be, storing an updated ASR object in database 126.

Sequences of data blocks in a cache may be referred to herein as transient, un-sealed or dynamic sequences. Sequences of data blocks in a persistent or mass storage system (e.g., storage system 128) may be referred to herein as sealed or persistent sequences. In some embodiments, formation of sequences may be performed using, or based on, data in a cache (e.g., cache 130) and sealing sequences or creating persistent sequences may be done by, or may include, storing data in a persistent or mass storage device (e.g., storage system 128).

Unsealed sequences are subjected to addition of data elements and merging with other unsealed sequences in the staging area, and eventually transformed into sealed sequences when being written to the persistent storage. Sealed sequences may have data elements removed for reorganization purposes.

Data deduplication is known in the art (e.g., see http://searchstorage.techtarget.com/definition/data-deduplication). Generally, data deduplication reduces storage costs by storing only one, unique instance of a data block even if the data block is accessed using two or more different addresses or belongs to two or more content objects.

In some embodiments, some of the data stored in storage system 128 may be de-duplicated (or deduplicated). Generally, a de-duplicated storage system may be a storage system that does not include two or more identical data blocks (e.g., two data blocks, stored in two different addresses, but containing the exact same data). For example, rather than storing two identical data blocks for (and/or in) two different addresses, a single data block in a de-duplicated storage system 128 may be provided in response to a first request for data in a first address in storage system 128 and also in response to a second request for data in a second, different address in storage system 128.

In some embodiments, if a storage system includes duplicated blocks (e.g., a system with no deduplication), incoming data blocks (e.g., data blocks received for writing as described) may be treated as unique data blocks in a de-duplicated storage system. For example, a in a flow as shown by FIG. 2, block S220 may be skipped such that after receiving, from a user, a data block and a logical address of the data block as shown by block S210, the flow proceeds to checking if the address of the received data block is close to an existing sequence as shown by block S230. Accordingly, a system and method according to embodiments of the invention may support either a de-duplicated storage system or a storage system that includes duplicated data blocks or units.

A system and method may receive a request to write a data block to a storage system (e.g., to storage system 128) and determine whether or not a data block is already stored in the storage system. In some embodiments, determining whether or not a data block is already stored in the storage system may be based on the content of the data block. For example, a hash number of value generated based on the content of a received data block may be compared to the hash values of all other data blocks in the storage system, if an identical or same hash value is found then a system and method may determine that the data block already exists, or stored in the storage system.

If the data block is not stored or present on the storage system, a system and method may search for a known or used sequence of addresses that is close to the received logical address. If a sequence of data blocks that is close to the logical address of the received data block is found, a system and method according to embodiments of the invention may store a copy of the received data block with respect to the sequence of data blocks and update related metadata.

If a sequence of data blocks that is close to the logical address of the received data block is not found, a new ASR object may be created and the new ASR object may be updated to include, or reference the received data block, the received data block may then, or at a later stage, be stored in storage system 128.

A unique data block as referred to herein is a data block included in no more than one sequence of data blocks in a cache or staging component (e.g., in cache 130) and no more than one sequence of data blocks in a mass storage system (e.g., in storage system 128). As described herein, a system and method according to embodiments of the invention may keep, or store, in storage system 128, unique blocks of data that are likely to be accessed together, concurrently or at the same time. For example, unique blocks that are read or written "together", in a close temporal proximity, may be stored on a contiguous or small set of physical sectors or blocks in a disk in storage system 128. Accordingly, performance of storage system 128 may be improved.

A flow or method according to embodiments of the invention may include determining whether or not a received data block is unique (e.g., at most, stored once in cache 130 and once in storage system 128). If a received data block is unique, the flow may include searching for a sequence of data blocks with an address range that is close to the address of the received data block, if such sequence is found, the flow may include adding the received data block to the sequence of data blocks and updating metadata such that the sequence of data blocks is extended to include the received data block. For example, searching for a sequence of data blocks with an address range that is close to the address of the received data block may be accomplished by server 120 by examining ASR objects in database 126 and updating metadata may be done by server 120 by updating metadata in an ASR object as described.

If sequence of data blocks with an address range that is close to the address of the received unique data block cannot be found, a flow according to embodiments of the invention may include creating a new sequence for the received unique data block. For example, server 120 may create a new ASR object for a unique data block received for writing and update the new ASR object to include metadata as described (e.g., the logical address of the data block).

A data block received for writing may be non-unique, e.g., it may already be stored in storage system 128. If the received data block is non-unique, a flow according to embodiments of the invention may include finding at least one sequence of data blocks that is close, address wise, to the logical address of the non-unique data block and adding the non-unique data block to the sequence. For example, server 120 may find an ASR object including, associated with, or related to, an address sequence range that is close to the logical address of a non-unique data block and may update the ASR's properties (e.g., the address range in the SR). It will be noted that the actual data in the received data block may not be added to the ASR and that only properties or metadata of the ASR may be modified or updated.

According to embodiments of the invention, data from a staging component (e.g., cache 130) may be removed. For example, when cache 130 reaches a predefined threshold capacity, data blocks may be moved from cache 130 to storage system 128 e.g., by removing them from cache 130 and storing them in storage system 128. According to some embodiments, prior to removing data from a cache or memory, sequences may be merged. For example, server 120 may search for ASR objects having, including or associated with sequences address ranges that are close and may merge such ASR objects as described. After merging two or more ASR objects to produce a new or updated ASR object, data blocks referenced by the new or updated ASR object may be stored in storage system 128 such that they can be accessed, by storage system 128 with high speed or efficiency. For example, data blocks included in or referenced by an update or new ASR object may be stored in a sequence of contiguous or neighboring sectors, blocks or other units in storage system 128. Merging of ASR objects may be done in order to reduce the size of metadata and reduce management efforts required. For example, managing or manipulating one ASR object having an address range of 1-1000 is much more efficient than managing or manipulating ten ASR objects having an address range of 100 each.

Of course, an ASR with an address range of 1-1000 is not necessarily associated with exactly 1000 blocks of data. For example, since a system and method according to some embodiments may allow gaps when assigning a data block to an ASR (e.g., a data block in address 302 can be assigned to an ASR object associated with an address range of 1-300), the actual amount of data associated with an ASR object or address range may be different from the size of the relevant address range. In another case, an ASR with the range of 1-1 can hold, reference, or be associated with, multiple different blocks of data written to logical address 1. Accordingly, the actual amount of data included in, or associated with, an ASR object or an address sequence range may be included in, and/or determined based on, metadata in the ASR object and not based on the address range size of the ASR object.

Merging of ASR objects may be done by server 120 at any point in time or based on any trigger or event. For example, server 120 may periodically check the size of address ranges in ASR objects in database 126 and may merge ASR objects in order to reduce the number of ASR objects, remove ASR objects with small address ranges and so on. Any rule or criteria may be used in order to trigger or cause merging of ASR objects as described herein. For example, a first and second ASR objects, each having relatively small address ranges, and wherein the address ranges are close to one another may be merged based on size and proximity criteria or rules.

A new ASR object may be related to or describe data blocks already stored in a persistent or mass storage unit. For example, when creating a new ASR object, data blocks may be read from storage system 128, deleted from storage system 128 and rewritten to storage system 128 based on the new ASR object. For example, a new ASR object may include data blocks already stored in storage system 128 as well as new data and, in order for all data blocks included in the new ASR to be stored together in storage system 128, the data blocks already stored in storage system 128 may be moved, in storage system 128, to a new physical location or address and the new data included in the new ASR object may be store in physical addresses that are near or adjacent to the addresses of the moved data. Accordingly, all data blocks associated with an ASR object may be stored in a contiguous address range, or in a set of physically close addresses on a storage system.

According to embodiments of the invention, a flow of reading data from a storage system may include determining if the block is stored in a caching or staging unit and, if so, providing the requested data block from the caching or staging unit. For example, server 120 may receive a request for data, the request including a logical address and may provide the requested data from cache 130. According to embodiments of the invention, if a requested data block is found in a caching or staging unit but no ASR object referencing the data block is found then server 120 may search for an ASR object having an address range that is close to the address of the requested data block. If such ASR object is found, the requested data block may be added to the ASR object. If no such ASR block is found, server 120 may create a new ASR object and include the requested data block in the newly created ASR object.

If a requested data block cannot be found in the staging or caching unit, it may be read from a storage system and an access frequency parameter or value of the requested data block may be updated and examined. For example, the access frequency of a set of data blocks (or of specific data blocks) may be updated in metadata of an ASR associated with the set or specific data block. If an access frequency of a data block that is not stored in a staging or caching unit is above a threshold or otherwise meets a criterion, a new ASR object may be created for the data block. For example, if a data block that is stored in storage system 128 but not in cache 130 is read or accessed frequently (e.g., four times in the last hour) then server 120 may create a new ASR object and associate the new ASR object with the data block by recording the logical address and size of the data block in metadata of the new ASR.

In some embodiments, frequency considerations and/or using a frequency parameter or value as described herein may be combined with other considerations.

For example, if an access frequency of a data block that is not stored in a staging or caching unit is above a threshold as describe, a system and method according to embodiments of the invention may check whether or not an existing ASR object can be used to store, reference or include the data block, e.g., as described herein. If an existing ASR object that can include or reference the data block can be found then a system or method according to embodiments of the invention may assign the data block to, or associate the data block with, the existing ASR object (e.g., by updating properties, metadata or other data in the existing ASR object as described herein). If an existing ASR object that can include or reference the data block cannot be found then a system or method according to embodiments of the invention may create a new ASR and associate the data block with the newly created ASR object, e.g., as described herein in the case of writing new data block.

In some embodiments, adding a data block to an ASR object may only require updating metadata of an ASR object. For example, to include a data block stored in storage system 128 but not in cache 130 (e.g., during serving a read request), server 120 may update metadata of an existing ASR object without moving, copying, deleting or otherwise manipulating the data block added to the ASR object. For example, if an ASR object associated with, or referencing addresses 50-59 is stored in database 126 and a request for a data block at address 60 is received then server 120 may add the data block at address 60 to the ASR object by updating metadata of the ASR object such that instead of referencing addresses 50-59 the ASR object references, includes or is associated with addresses 50-60.

In some embodiments, a flow of reading a data block from a storage system (e.g., in order to provide the data block in response to a request) may include reading the block from a storage system into a cache. The flow may further include checking if rearrangement of data in the system is needed. For example, server 120 may check if optimal arrangement of data can be achieved by assign the data block to a new or existing ASR object as described herein. If optimal or better arrangement of data in a system can be achieved by including, or associating the data block with an ASR as described then server 120 may include the data block just read in an ASR object, e.g., by updating and ASR object (either an existing or new one) as described herein.

The principles of the invention are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture, e.g., computing device 1000 or server 120. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. A person skilled-in-the-art will readily note that other embodiments of the invention may be achieved without departing from the scope of the disclosed invention. All such embodiments are included herein. The scope of the invention should be limited solely by the claims thereto.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of managing data in a computer storage system, the method comprising:
    storing at least one address sequence range (ASR) object, wherein each ASR object comprises:
        at least one pointer to an address in the storage system of a first data block stored therein; and
        a respective at least one first logical address associated with said at least one first data block;
    receiving a second data block and a respective second logical address of said second data block;
    comparing the distance between a value of said at least one first logical address included in the at least one ASR object and the value of the second logical address to a threshold;
    selecting one ASR object of the at least one ASR objects based on said comparison;
    storing the second data block in the storage system such that it is physically stored adjacent to data blocks already included in the ASR object; and
    updating the selected ASR object to include the second logical address.

2. The method of claim 1, comprising:
    generating a new ASR object based on the logical address;
    storing the data block in the storage system; and
    updating the new ASR object to include the logical address.

3. The method of claim 1, comprising:
    if the second data block is stored in the storage system then updating an ASR object that comprises a pointer to the second data block, to include the second logical address, without storing the data block again in the storage system.

4. The method of claim 1, comprising:
    identifying, in a set of ASR objects, at least one ASR object having a first address sequence range that meets at least one criterion; and
    merging the first address sequence range with a second address sequence range of at least one other ASR object to produce a new address sequence range.

5. The method of claim 4, wherein the two address sequence ranges are related to data stored in a random access storage system.

6. The method of claim 4, comprising selecting to merge the first and second address sequence ranges based on comparing a distance between address values included in their respective range values to a threshold.

7. The method of claim 1, comprising merging, based on a frequency of access of a data block, at least two address sequence ranges to produce a new address sequence range.

8. The method of claim 1, comprising:
receiving a request to access a data block in the storage system, the request including a logical address; and
if a pattern of requests for accessing the data block meets a criterion then generating a new ASR object based on the logical address.

9. The method of claim 1, comprising:
calculating a heat value of an address sequence range based on a frequency of requests for reading data in the address sequence range and based on at least one of: a time of the requests, a storage volume that stores a requested data block, a user requesting a data block and an application requesting a data block; and
merging at least two address sequence ranges based on a heat value of at least one of the address sequence ranges.

10. The method of claim 1, comprising, based on a frequency of access to a data block, creating a ASR object and associating the data block with the newly created ASR object.

11. A system for automated data organization in a storage system, the system comprising:
a memory; and
a controller, the controller configured to:
store at least one address sequence range (ASR) object, wherein each ASR object comprises:
at least one pointer to an address in the storage system of a first data block stored therein; and
a respective at least one first logical address associated with said at least one first data block;
receive a second data block and a respective second logical address of said second data block;
compare the distance between a value of said at least one first logical address included in the at least one ASR object and the value of the second logical address to a threshold,
select one ASR object of the at least one ASR objects based on said comparison;
store the second data block in the storage system such that it is physically stored adjacent to data blocks already included in the ASR object; and
update the selected ASR object to include the second logical address.

12. The system of claim 11, wherein the controller is configured to:
generate a new ASR object based on the logical address;
store the data block in the storage system; and
update the new ASR object to include the logical address.

13. The system of claim 11, wherein the controller is configured to:
determine that the second data block is stored in the storage system; and
update an ASR object that comprises the second data block to include the second logical address, without storing the data block again in the storage system.

14. The system of claim 11, wherein the controller is configured to:

identify, in a set of ASR objects, at least one ASR object having an address sequence range that meets at least one criterion; and
merge the address sequence range of the at least one ASR object with an address sequence range of at least one other ASR object to produce a new address sequence range.

15. The system of claim 14, wherein the two address sequence ranges are related to data stored in a random access storage system.

16. The system of claim 14, wherein the controller is configured to select to merge the at least two address sequence ranges based on comparing a distance between address values included in their respective range values to a threshold.

17. The system of claim 11, wherein the controller is configured to merge, based on a frequency of access of a data block, at least two address sequence ranges to produce a new address sequence range.

18. The system of claim 11, wherein the controller is configured to:
calculate a heat value of an address sequence range based on a frequency of requests for reading data in the address sequence range and based on at least one of: a time of the requests, a storage volume that stores a requested data block, a user requesting a data block and an application requesting a data block; and
merge at least two address sequence ranges based on a heat value of at least one of the address sequence ranges.

19. The system of claim 11, wherein the controller is configured to, based on a frequency of access to a data block, create a new ASR object and associate the data block with the new ASR object.

20. A method of managing a storage system, the method comprising:
storing at least one address sequence range (ASR) object, wherein each ASR object comprises:
at least one pointer to an address in the storage system of a first data block stored therein; and
a respective at least one first logical address associated with said at least one first data block;
receiving a second data block and a respective second logical address value of said second data block;
if, based on comparing the distance between the second logical address value and the value of the at least one first logic address included in the at least one ASR object to a threshold, an ASR object having an address sequence range that is close to the address of the logical address is identified then:
storing the data block in the storage system such that it is physically stored adjacent to data blocks already included in the identified ASR object, and
updating the identified ASR object to include the second logical address, and
if an ASR object is not identified then:
generating a new ASR object based on the logical address,
storing the second data block in the storage system, and
updating the new ASR object to include the second logical address.

* * * * *